Jan. 5, 1971 K. ROTH 3,552,226
GEAR WITH INVOLUTE TEETH
Filed July 29, 1969
2 Sheets-Sheet 1

Jan. 5, 1971     K. ROTH     3,552,226
GEAR WITH INVOLUTE TEETH
Filed July 29, 1969     2 Sheets-Sheet 2
Fig. 4a
Fig. 5a
Fig. 4b
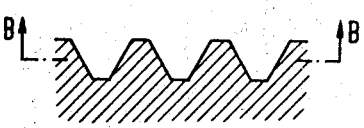
Fig. 5b
Fig. 6
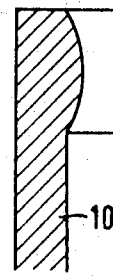
Fig. 7
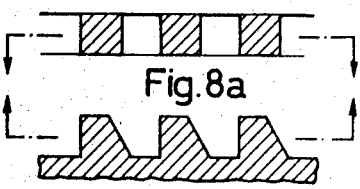
Fig. 8a
Fig. 8b
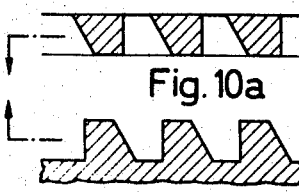
Fig. 10a
Fig. 10b
Fig. 9a
Fig. 9b 3,552,226
GEAR WITH INVOLUTE TEETH
Karlheinz Roth, Rudolf-Wilke-Str. 11,
Braunschweig, Germany
Filed July 29, 1969, Ser. No. 845,727
Claims priority, application Germany, July 31, 1968,
1,775,345
Int. Cl. F16h 55/08
U.S. Cl. 74—457                                                 8 Claims

ABSTRACT OF THE DISCLOSURE

A gear has involute teeth arranged in a circular and coaxial group on one or both lateral faces of a cylindrical or disc-shaped gear body. In the axial direction the teeth have a wedge-like shape whose width increases toward the part of attachment of the tooth. The utilizable portion of the teeth flanks is shaped so as to remain in continuous rolling engagement in both rolling directions with a reference rack configuration of constant division whose teeth width continuously varies in the direction parallel to the gear axis. In a gear pair such a gear meshes with another gear of the same tooth design whose axis of rotation is parallel to that of the first-mentioned gear. While the above-mentioned rack concept serves to geometrically define the gear teeth, a rack of this type may also serve as a tool for producing the tooth flanks of the gear.

---

My invention relates to a gear with involute teeth and, more particularly, to a gear whose disc or body portion of generally cylindrical shape carries the teeth laterally on one or both of its faces.

It is an object of my invention to devise a gear of such type that lends itself particularly well to being made of synthetic materials, without excluding its production from other materials.

Another object of the invention is to provide a gear with lateral teeth which individually, in contract to an individual bevel gear, can readily be used for providing any desired transmission ratio.

Still another object of the invention is to develop a pair or train of gears with laterally arranged teeth which is less sensitive to the occurrence of excessive tolerances or clearances as are conventional bevel-gear mechanisms.

A further object of my invention in conjunction with one or more of those mentioned above, is to provide gear pairs in which one or both of the gears can be given a smaller number of teeth than permissible in conventional gears, without the occurrence of excessive undercutting, in spite of any desired dimension of the reference rack profile, so that the smallest number of teeth is limited only by sufficient contact ratio.

It is also an object of my invention to devise a pair of train of gears which affords the clearance between the teeth of respective intermeshing gears to be axially adjusted after the individual gears are mounted on their respective shafts, such adjustability being not afforded by the conventional gear pairs having a fixed spacing between the two gear axes.

My invention further aims at reducing the susceptibility of the gears to trouble due to mechanical stress and deformation imposed upon the root-adjacent (dedendum) portion of the teeth when a pair of such gears is operated under load, thus further improving the gears particularly if they are made of synthetic plastic.

My invention is predicated upon the following considerations.

Gears made of synthetics often encounter problems not occurring or appreciable with metal. It is not sufficient to attempt modifying the synthetics so that they will become similar to the known metallic materials, and to then employ the synthetic material for the production of gears on the basis of the experience gained with metal. My invention therefore follows the inverse concept of adapting the geometry of the gear teeth to the particular properties of the synthetic material. Disadvantages of synthetics which must be coped with for affording a utilization of their advantages, consist in the large elasticity and the relatively large volumetric change of 1 to 2% by absorption of water and by heating. Conventional gears of synthetic materials must have large backlash of teeth to prevent radial elongations from resulting in edging or blocking of the gear. As a rule, such a large clearance at the teeth flanks is undesirable because, for example upon reversal of the rotating direction, a large idling range of reversing travel will occur, or the teeth may tend to vibrate in the event of non-uniform loading.

Gears of the initially mentioned type with laterally arranged teeth have heretofore been used for gear pairs in which the axes of the two meshing gears extend perpendicularly or at another angle to each other. Such gears are designed as bevel gears or crown gears, the latter having teeth arranged on a coaxial circle at a lateral face of the gear body, whereas the second gear of the pair is a spur gear or pinion of the ordinary type. A solution of the above-outlined problems has not been intended or achieved by such gear pairs.

For attaining the above-mentioned objects and in accordance with my invention, I provide a substantially cylindrical or disc-shaped gear body with a circular and coaxial group of gear teeth on at least one of its lateral faces and give the teeth in the peripheral direction a width which increases toward the tooth root in a wedge-like configuration, the utilizable flank areas of the teeth being shaped so as to be capable of continuously shape-constrained rolling engagement of the teeth in both rolling directions with a reference rack configuration of constant division whose teeth width continuously varies in the direction parallel to the gear axis.

Such a gear, being characterized by rollability on the reference rack, can mesh with another gear designed in the same manner. This results in a planar-type teeth configuration with the axes of the two intermeshing gears parallel to each other. The teeth of the two gears are of the involute type, even though the teeth—contrary to the conventional teeth of spur gears— are not located on the cylindrical surface but laterally on the disc-shaped body of the gear.

This results in fundamental advantages of the meshing engagement between gears according to the invention. When two such gears are paired, the two planar discs that constitute the gear bodies mesh with each other at their respective lateral faces and consequently run in laterally displaced relation to each other. For that reason, radial elongation, apt to occur with gears made of synthetic plastics, cannot affect the meshing engagement. The clearance between the meshing teeth can be adjusted or regulated despite the fixed mutual spacing between the gear axes, because only an axial and no radial displacement is needed for this purpose. As a result, the line contact between the tooth flanks always remains preserved. The danger of edging or clamping by abutting of a tooth against the valley next to the other tooth is obviated so that a gear pair according to the invention is particularly well suitable for small moduli.

A planar gear made according to the invention can also be paired with a conventional spur gear of any number of teeth, provided the teeth of the spur gear are produced with the aid of the same reference rack profile. In a pair of this kind the axes of the respective tooth groups are perpendicular to each other so that the pair functionally corresponds to a bevel-gear pair. In contrast thereto, however, the invention affords placing one and the same planar gear in meshing engagement with a spur gear of any number of teeth, this advantage being due to the fact that the generating tool profile is a rack profile. For that reason, any desired transmission ratios are obtainable in a very simple manner, and a gear pair according to the invention is not as tolerance sensitive as a conventional pair of bevel gears.

In a pair of gears according to the invention, the smaller gear may be given external teeth and the larger gear internal teeth. The planar internal row of teeth in this case is a negative of the planar external teeth made in accordance with the same tooth data. The tooth shapes of the internal teeth are produced, for example, by taking a planar gear with external teeth and embedding it in casting mass in order to obtain a mold which is then filled with plastic material to obtain the second gear. The teeth of the original, external gear then correspond to the valleys, and the valleys of the original gear correspond to the teeth of the casting or plastic material which results in the second gear.

According to still another feature of the invention a pair of gears having parallel axes respectively is composed of one gear whose disc-shaped cylindrical body carries circular groups of teeth on both sides, and a second gear which comprises two gear bodies axially spaced from each other and provided with respective lateral circular groups of teeth facing each other. In this manner, the occurrence of axial thrust or displacement can be minimized or obviated and the overlapping degree can be increased.

The invention will be further explained with reference to embodiments illustrated by way of example on the accompanying drawings, in which:

FIG. 1a is a lateral view of a gear pair according to the invention and FIG. 1b shows the same pair in a section taken along the vertical center line of FIG. 1a;

FIGS. 4a and 4b show an embodiment of a reference rack for determining the teeth on a gear according to the invention, FIG. 4a being a section taken along the line B—B in FIG. 4b, and FIG. 4b a section along the line A—A in FIG. 4a;

FIGS. 5a and 5b illustrate another embodiment of a reference rack in the same manner as set forth with reference to FIGS. 4a and 4b;

FIG. 6 is a partial and sectional view of a gear according to the invention such as those shown in FIG. 1a and FIG. 1b;

FIG. 7 is a partial and sectional view of another gear according to the invention in which the teeth have a bulging shape;

FIGS. 8a and 8b illustrate a further embodiment of a reference rack according to the invention, FIG. 8a being a section taken along the line indicated in FIG. 8b, and FIG. 8b a section along the line indicated in FIG. 8a;

FIGS. 9a, 9b and FIGS. 10a, 10b show sectionally two further examples of reference racks in the same manner as set forth with reference to FIG. 8;

Figure 1A:
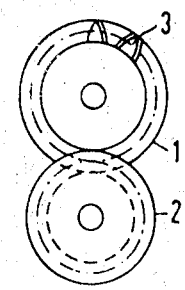
Figure 1B:
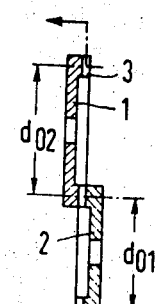

FIGS. 1a and 1b show two planar-type gears 1 and 2 according to the invention. The gears have parallel axes of rotation. The appertaining pitch-circle cylinders have the diameters $d_{01}$ and $d_{02}$. The division of the teeth 3 along a secant touching the pitch cylinder is uniform. In lieu of the second planar gear 2, a spur gear can be placed into meshing engagement with the gear 1, in which case the respective gear axes would be perpendicular to each other.

Figure 2A:
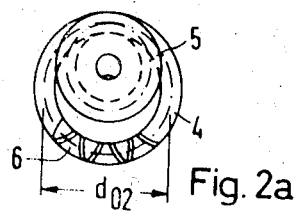
FIG. 2a is a lateral view of a second gear pair according to the invention.
Figure 2B:
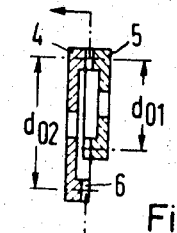
FIG. 2b is a vertical section of the same gear.

FIGS. 2a and 2b show two planar gears 4 and 5 similar to those of FIGS. 1a and 1b, except that the axis of gear 5 passes through the area occupied by the gear 4. In this case the gear 4 must possess planar internal gear teeth. As shown in FIG. 2b, the teeth 6 are shaped in negative relation to the teeth of an external-tooth gear according to the invention.

Figure 3:
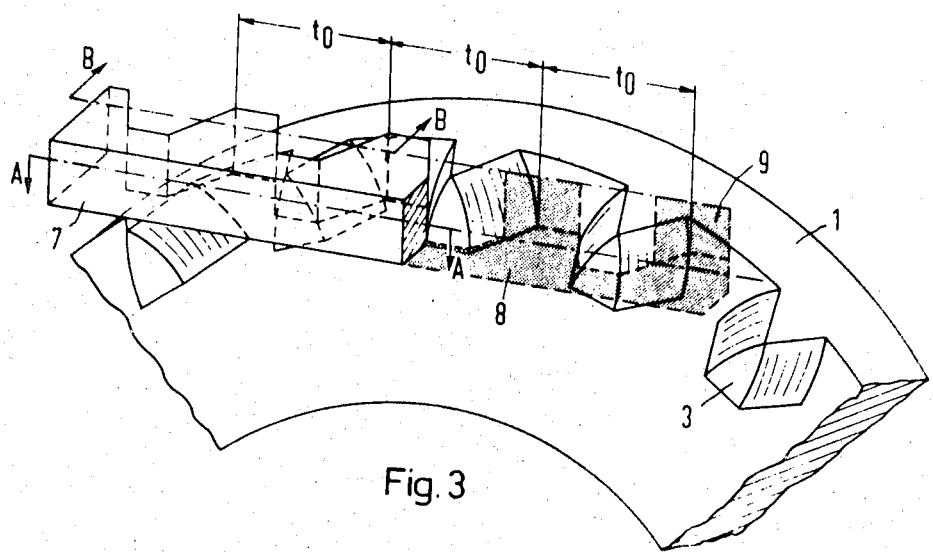
FIG. 3 is a schematically perspective and partial view of a gear according to the invention in meshing engagement with a reference rack that determines the shape of the tooth flanks on the gear.

FIG. 3 serves to indicate how the reference rack 7 determines the shaping of the teeth 3. During rolling of the gear teeth in both directions, these teeth are continuously in positive, i.e. shape-constrained engagement with the then active flanks of the rack teeth. The illustration indicates the constant division $t_0$ of the reference rack 7 and consequently also of the teeth 3 of gear 1. The dotted area 8 in FIG. 3 identifies a secant sectional plane. In this plane the reference rack tapers in a direction parallel to the rolling-cylinder axis, that is in the direction indicated by arrows B. Accordingly, the teeth of the rack widen from their free ends down to the tooth roots of the gear body 1.

As will be apparent from the frontal section 9 of rack 7, the rack teeth shown in FIG. 3 have a rectangular shape in a section plane perpendicular to the gear axis. Consequently, the shape of the reference racks 7 illustrated in FIG. 3 corresponds to the rack represented by the sectional views in FIGS. 4a and 4b.

However, the rack for determining the shape of the gear teeth may also be in accordance with FIGS. 5a and 5b. In this embodiment the width of the rack teeth decreases continuously not only in the direction B (FIG. 3) but also in the direction A (FIG. 3) perpendicular to the gear axis.

FIG. 6 shows the gear 1 of FIG. 1b with the laterally arranged tooth 3 on larger scale in distinction from the embodiment of FIG. 7 where the gear body 10 is provided with teeth 11 of bulging shape.

FIGS. 8a, b, 9a, b and 10a, b show further modifications of the reference rack which may mesh with, or be used for determining the teeth of, gears according to the invention. The contours in FIGS. 8a, 9a and 10a correspond to the profile in frontal section corresponding to FIG 4a. The contours shown in FIGS. 8b, 9b and 10b correspond to the respective profiles of the rack in a secant section. In FIGS. 8a, 9a and 10a the unhatched portion of the contour simultaneously corresponds to the reference rack profile of the counter gear in the sectioned frontal plane. This reference profile, during rolling engagement with the gear, always produces the correct involute flank at the teeth of the counter-gear by virtue of the resulting envelope sectional contour.

The rack teeth may also be given a trapezoidal shape in the secant section so that both inclined sides have an inclination in the same direction, one side being inclined at a larger angle than the other, similar to the teeth of a saw blade. The corresponding profile shape will then also appear at the gear teeth.

The invention also affords the use of synthetic plastics for very small gears with teeth of very small modulus as usually employed in watches. The danger of the gears becoming disengaged or locked, as may occur with conventional teeth, can be avoided by a slight elastic axial pressure. Such pairs or trains of gears may also combine the advantages of friction gears and spur gears. When the driving torque becomes excessive the teeth may slip, whereas with a normal driving torque the teeth will constrainedly operate so that no slip can occur. By virtue of gear teeth according to the invention, for example as illustrated in FIGS. 8a to 10b, it is also possible to obtain slippage in one direction of rotation, but to prevent slipping in the other direction. In this manner, a free-wheeling action is obtained.

Figure 11:
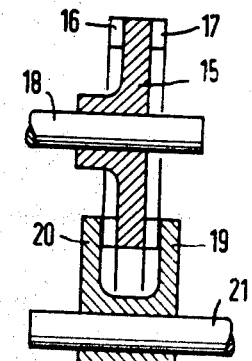
FIG. 11 is a sectional view of still another gear pair according to the invention.

In the gear pair shown in FIG. 11, the upper gear 15 on shaft 18 has circular groups of teeth 16 and 17 on both lateral sides. The second gear on shaft 21 is composed of two gears 19 and 20 each having teeth 22 and 23 in meshing engagement with the respective teeth 16 and 17 of gear 15. The two shafts 18 and 21 are parallel. Such a gear pair prevents the transmission of axial thrust from one gear to the other.

It will be understood from the above-described embodiments, that gears according to the invention can readily be paired with other gears of any desired number of teeth. This is in advantageous contrast to prior proposals of planar gears of the crown-gear type in which the planar gear cannot be paired with a second planar gear nor with any spur gear other than the one used as a tool for manufacturing the planar gear teeth or which is similar to the tool. Furthermore, by correspondingly selecting the meshing angle, gears according to the invention avoid the occurrence of undercutting with any desired dimensions of the reference profile. This permits minimizing the number of teeth. That is, the smallest technically useful number of teeth can be used, limited only by the requirement that the overlapping degree does not become smaller than unity.

Another decisive advantage of gears according to the invention resides in the axial adjustability of the flank tolerance or clearance after the gear or gear pair is mounted in operative condition. Thus, any manufacturing tolerances can readily be compensated. With convenional gears, comprising two individual gears of a fixed axial spacing, such a subsequent variation in flank clearance is not possible.

Gears according to the invention are further of considerable advantage with respect to mechanical strength. Due to the lateral mounting of the teeth, the effect upon the root of the teeth differs from that occurring with the convenional gear teeth in remaining substantially constant over the entire area of engagement. This is because, with respect to the critical cross section, the leverage of the bending stress does not vary. Consequently, the tooth deformation under load remains independent of the instantaneous point of meshing engagement. Both properties are particularly favorable with gears made of synthetic plastic.

Another advantage is the ease of manufacture. That is, gears according to the invention can be economically produced by injection molding due to the fact that the tooth configuration, either of the external or the internal type, can be readily shaped by casting or molding operation.

To those skilled in the art, it will be obvious upon a study of this disclosure that my invention permits of a great variety of modifications and may be given embodiments other than particularly illustrated and described herein, without departing from the essential features of my invention as set forth in the claims annexed hereto.

I claim:
1. Gear with involute teeth, comprising a substantially cylindrical gear body having a circular and coaxial group of gear teeth on at least one of its faces, said teeth having in the peripheral direction a width which increases toward the tooth root in wedge-like configuration, and said teeth having their utilizable flank areas shaped so as to be capable of continuously shape-constrained rolling engagement in both rolling directions with a reference rack configuration of constant division whose teeth width continuously varies in the direction parallel to the gear axis.

2. In a gear according to claim 1, said teeth having a rectangular cross section along sectional planes containing the gear axis.

3. In a gear according to claim 1, said gear teeth having a shape bulging in a direction away from said gear body.

4. Gear according to claim 1, characterized in that the tooth width of said reference rack also decreases continuously in a direction perpendicularly toward the gear axis.

5. Gear according to claim 1 characterized in that the teeth of the reference rack have a trapezoidal shape in the transverse section and in a sectional plane extending along a tooth secant.

6. Gear according to claim 1 characterized in that the teeth of the reference rack have a trapezoidal shape in a sectional plane extending along a tooth secant.

7. A gear pair comprising two gears according to claim 1 with mutually parallel axes, said two gears having different diameters, the smaller one of said gears having external-type teeth, and the larger one of said gears having internal-type teeth.

8. A gear pair comprising two gears according to claim 1, one of said gears having two of said groups of teeth on its two faces, the other gear being composed of two interconnected and axially spaced bodies each having a coaxial and circular group of teeth facing the other gear body and meshing with the respective tooth groups of said first gear.

References Cited
UNITED STATES PATENTS

| | | | |
|---|---|---|---|
| 294,819 | 3/1884 | Speers, Sr. | 74—457 |
| 2,718,793 | 9/1955 | Hawthorne | 74—457 |

LEONARD H. GERIN, Primary Examiner